May 8, 1945.  W. S. BLAUVELT  2,375,517
FURNACE
Filed Aug. 21, 1941  3 Sheets-Sheet 1

INVENTOR
Warren S. Blauvelt
by R. V. Craddock
ATTORNEY

May 8, 1945. W. S. BLAUVELT 2,375,517
FURNACE
Filed Aug. 21, 1941 3 Sheets-Sheet 3

FIG.7

INVENTOR
Warren S. Blauvelt
by
ATTORNEY

Patented May 8, 1945

2,375,517

UNITED STATES PATENT OFFICE 2,375,517

FURNACE

Warren S. Blauvelt, Ann Arbor, Mich.

Application August 21, 1941, Serial No. 407,717

16 Claims. (Cl. 237—8)

It is the purpose of this invention to provide a furnace for solid fuel burning purposes which is particularly designed for continuous, year around operation to supply heat for house heating purposes when a demand is made therefor and otherwise to provide no heat for house heating purposes when such a demand does not exist and to supply sufficient heat for domestic hot water heating purposes substantially constantly to maintain a volume of water at or above a desired temperature. Furthermore, it is the purpose of this invention to provide a furnace having the above function which may be wholly automatically controlled and which is so controlled that, so long as a supply of fuel to the fuel bed is maintained sufficient to meet the demand on the furnace, the fuel bed temperature will be always maintained sufficiently high to prevent the fire from going out whereby the furnace may at any time be caused to operate under accelerated combustion as compared to combustion under idling conditions when no heat demand exists.

It is also the purpose of this invention to provide a furnace embodying a minimum number of parts or passages through which the products of combustion may pass either to satisfy a house heating demand or a water heating demand, or both, and also through which the products of combustion may pass when an operation of the furnace occurs merely for the purpose of raising the fuel bed temperature; said furnace being so constructed and arranged that substantially no heat is supplied thereby for house heating purposes in the absence of a demand therefor.

My invention particularly relates to a furnace, which is primarily designed for solid fuel burning purposes and which comprises a plurality of passages for the flow of products of combustion therethrough, each of said passages including a heat-transfer device.

It is a first object of my invention to provide a furnace of the above character having a plurality of passages which communicate with the combustion chamber and each of which includes a heat-transfer device, and control means for controlling the passage of products of combustion to said devices, one of said passages being employed for the discharge of said products of combustion under furnace idling conditions and when a draft is passed through the fuel bed for maintaining at all times a sufficiently high temperature within the combustion chamber to support continued combustion of the fuel.

It is another object of my invention to provide a furnace of the above character in which the heat-transfer device included in one passage is employed for house heating purposes and the heat-transfer device included in a second passage is employed for domestic hot water heating purposes, and control means for controlling the flow of products of combustion to said heat-transfer devices so that the products of combustion may at all times pass freely through one passage but are controlled to pass through one or the other of the heat-transfer devices when the media heated thereby indicate a heat demand.

Another object resides in providing a furnace of the foregoing character including means for controlling the flow of the products of combustion to the heat-transfer devices thereof and thermostatic means responsive, respectively, to the media heated by the heat-transfer devices, one of said thermostatic means being arranged to effect operations of said flow control means to control the flow of products of combustion to both of the heat-transfer devices and the other of said thermostatic means being arranged to effect, through said control means, a control of the flow of products of combustion to only one of the heat-transfer devices.

More particularly, it is an object of my invention to provide a furnace having two passages communicating with the combustion chamber, each including a heat-transfer device, valve means for controlling the flow of products of combustion through said passages and means for operatively connecting said valves together whereby positively to open a first of said valves when the other is closed but to permit said first valve to be opened while the other valve is also open.

Still another object lies in providing in combination with a furnace of the foregoing character a domestic hot water reservoir which is so arranged that the temperature of the water therein cannot exceed to any substantial degree a reasonably safe temperature even though the heat-transfer device which is employed in supplying the hot water thereto is subjected to the hot products of combustion over periods when no heat demand exists.

With these and still other objects in view, my invention includes the novel elements and the correlation and arrangements of elements described below and illustrated in the accompanying drawings, in which—

Figure 1:
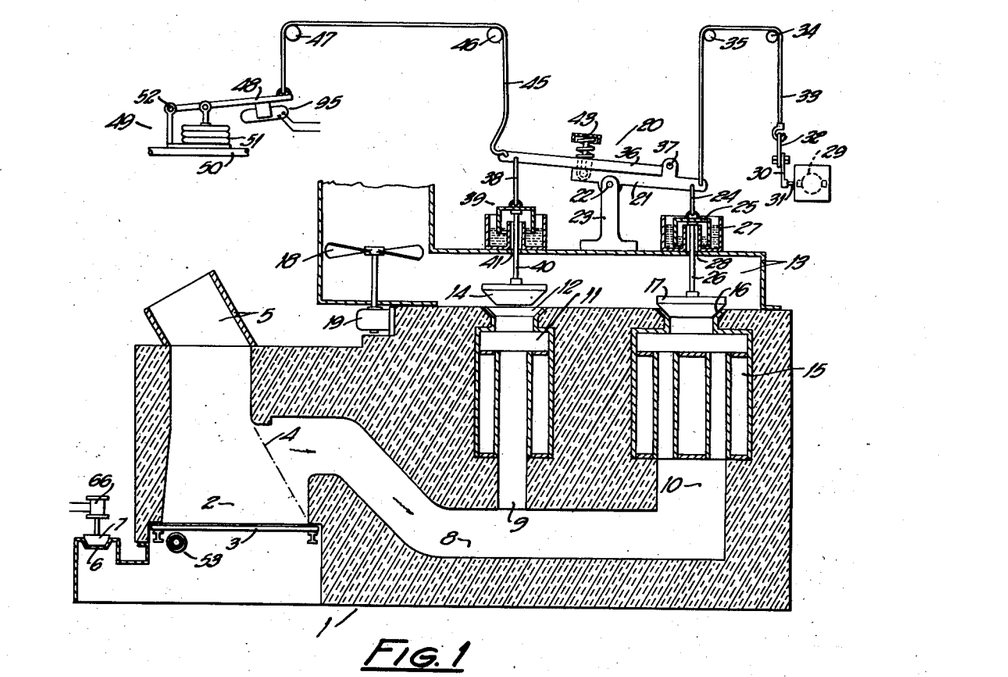
Fig. 1 is a fragmentary sectional elevation view of a furnace embodying a preferred form of my invention.

Referring to the drawings and first to Fig. 1, 1 indicates generally a furnace comprising a combustion chamber 2 within which fuel may burn upon a grate 3. The dot-dash line 4 represents generally the surface of the fuel bed, and fuel may be delivered thereto through a supply passage or magazine 5. Air is admitted to the ash pit of the furnace through an opening 6 therein and an air inlet valve 7 is employed to control the admission of such air.

In the form of furnace illustrated herein a passage 8 communicates with the combustion chamber at some distance above the grate and preferably opposite the highest part of the active fuel bed and extends, first rearwardly, then downwardly and thence into communication with preferably vertically extending passages 9 and 10. The furnace is preferably well insulated, as illustrated, about the combustion chamber, the passages therein and the heat-transfer devices, hereinafter described.

The passage 9 includes a heat-transfer device indicated generally at 11. This device comprises one or a plurality of tubes through which the gases or products of combustion may flow and spaces about the tube or tubes for water. In the embodiment illustrated, the device 11 is adapted to be used in heating water for domestic use and, therefore, the passage 9 in which it is included preferably communicates with the passage 8 in a zone nearer the combustion chamber than the passage 10. By arranging the passages in this manner, there will be less tendency for the hot gases to flow toward the passage 10, and the heat-transfer device therein, which is adapted to be used for house heating purposes, will be insulated to a greater extent when the valve controlling the flow of gases therethrough is closed.

The upper end of the heat-transfer device 11 communicates through an orifice 12 with a breeching or exhaust passage 13 from which the products of combustion may pass to the stack. The orifice 12 is formed with a seat for a valve element 14 which is operable to control the flow of gases or products of combustion through the passage 9 and heat-transfer device 11.

Passage 10 also includes a heat-transfer device 15 which also communicates with the breeching 13 through an orifice 16 which is provided with a seat for a valve element 17. The heat-transfer device 15 is adapted to supply heat for house heating purposes, and the valve 17 is used to control the flow of gases therethrough.

The heat-transfer devices 11 and 15 are more or less schematically illustrated and it will be understood that, in practice, any form of heat-transfer device may be used.

In the furnace of my invention, I propose to operate it under forced draft either when heat is demanded for house heating purposes or for domestic hot water heating purposes, or for insuring continued combustion of the fuel during idling periods when no heat demand exists. For this purpose, an electrically driven exhauster 18 is mounted in the breeching and functions to provide an induced draft or flow of gases of combustion from the combustion chamber through the passages communicating therewith and the heat-transfer devices when the valves so permit. An electric motor 19 serves to drive the exhauster, and the manner in which motor 19 is controlled will be hereinafter described in connection with the control circuit of the furnace.

The preferred form of actuating mechanism for the valves 14 and 17 comprises a valve interconnecting device indicated generally at 20 which, in the embodiment illustrated, comprises a lever arm 21, pivotally mounted as at 22 intermediate the length thereof on a bracket 23 which may be mounted upon the breeching 13. To one end of lever 21 is connected the valve element 17. In the embodiment illustrated, this connection is accomplished by means of a rod 24, or a cable, which is fastened to the lever arm and to a generally hollow, dome shaped member 25. An element 26, which may be a shaft or cable, depends from the dome 25 and is connected to the valve 17. A receptacle 27 is mounted upon the breeching and is provided with inner walls defining a central passage or opening therethrough. The element 26 is adapted to pass through this passage while the downwardly extending walls of the dome 25 are adapted to pass between the inner and outer walls of the receptacle 27. A suitable liquid, as illustrated, is placed within the receptacle 27 and in conjunction with the dome 25, which is designed to be movable with respect to receptacle 27 but substantially at all times with the walls thereof at least in part immersed in the liquid, to form a seal whereby to prevent the products of combustion from escaping between the element 26 and the opening 28 in the breeching through which said element passes.

Lever 21 is operated by a control motor 29 which, in turn, as hereinafter more particularly explained, is controlled by a thermostat. This thermostat is adapted to be suitably disposed in one of the rooms of the building being heated and is designed to control the operation of the furnace for house heating purposes. The motor 29, when operated, serves to rotate a crank arm 30 which is mounted on and secured to a shaft 31 driven by said motor. To the arm 30, through the medium of a suitable, adjustable connecting element 32, is connected a cable 33 which passes over pulleys 34 and 35 and is connected to the lever 21 adjacent the end thereof to which the valve 17 is operatively connected.

When the lever arm 30 driven by motor 29 occupies the position illustrated in Fig. 1, the valve 17 will be seated thereby preventing a flow of products of combustion through the heat-transfer device 15. However, when the arm 30 is rotated to a position substantially 180 degrees from the illustrated position thereof, lever 21 will be actuated to elevate and unseat valve 17 thereby permitting a house heating operation of the furnace to take place. Of course, as hereinafter explained, when the valve 17 is raised, the fan motor 19 will be energized and the valve 7 which controls the admission of air to the ash pit will be opened.

The lever 21 also functions, when actuated, to effect an operation of valve 14. The connection between these valves and the lever 21 is, however, so arranged that lever 21, when actuated in a direction to seat valve 17, will positively raise the valve 14 from its seat but, when valve 17 is unseated, valve 14 may also be raised. In the embodiment of my invention herein illustrated, I accomplish the foregoing by providing a lever or arm 36 which is pivotally connected to lever 21 as at 37 and normally engages the upper surface of lever 21 so that when lever 21 is actuated to close valve 17, lever arm 36 will be rotated with lever 21 to elevate valve 14. Valve 14 is connected to lever arm 36 much in the same manner as valve 17 is connected to lever 21. In other words, a cable 38 is connected to arm 36 and to the dome element of a vapor seal 39 and a cable or shaft 40 passing through opening 41 in the breeching is connected to valve 14 and to the dome of the device 39.

Figure 2:
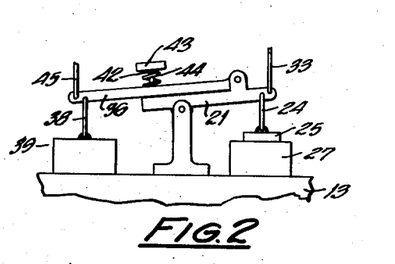
Fig. 2 is a fragmentary view of one form of common valve operating mechanism, moved to a position opposite to that shown in Fig. 1.
Figure 3:
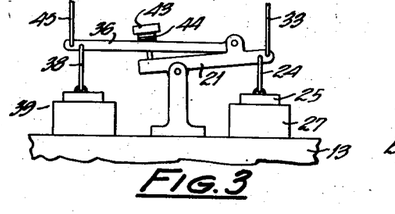
Fig. 3 is a view similar to Fig. 2 showing the parts in a still different position.

It will be observed that with the above described arrangement of lever 21 and arm 36, although arm 36 must pivot with the lever 21 when it is moved in a clockwise direction as shown in Fig. 1, this result does not necessarily follow when lever 21 is pivoted in a counter-clockwise direction. In other words, when lever 21 occupies the position illustrated in Figs. 2 and 3 wherein the valve 17 will be raised from its seat, arm 36 may occupy either the position shown in Fig. 2, wherein valve 14 will lie in seated position, or else it may occupy the position shown in Fig. 3. In the latter position of lever 21 and arm 36 both valves will be raised from their seats.

I prefer to provide the lever 21 with a rod 42 which passes through arm 36 and has a flanged plate-like element 43 secured to the free end thereof. A helical spring 44 is disposed about rod 42 and between arm 36 and element 43 whereby resiliently to urge arm 36 in engagement with lever 21 but permitting said arm to pivot relative to the lever when a lifting force is exerted thereon.

To the end of arm 36 is secured one end of a cable 45 which passes over pulleys 46 and 47 and is connected at its other end to a lever arm 48 of an aquastat indicated generally at 49. For purposes of illustration, I have shown the aquastat associated with pipe 50 which is connected in the domestic hot water supply system but, of course, it will be understood that the aquastat may be directly associated with the hot water reservoir or any desired portion of the hot water system. In the embodiment illustrated, the aquastat comprises a Sylphon bellows 51 which is connected with lever arm 48 and intermediate its length, the arm 48 being pivotally supported as indicated at 52.

Under no heat demand conditions of the domestic hot water supply system, the pulleys and arm 48 will occupy the positions illustrated in Fig. 1 wherein the valve 14 would be closed if it were not for the position occupied by the lever 21. However, when heat is demanded, the bellows actuates the arm 48 to move downwardly in a clockwise direction thereby causing cable 45 to pivot arm 36 about its pivot 37 in a clockwise direction and thereby raising valve 14 from its seat if, at this time, it were seated.

From the foregoing, it will be seen that both valves 14 and 17 are actuated through the medium of lever 21 and its associated parts. If no heat is demanded for house heating purposes, the valves 14 and 17 will occupy the positions shown in Fig. 1. However, when a house heating heat demand occurs, the room thermostat will effect, as hereinafter more particularly described, an operation of control motor 29 to effect an opening of valve 17 and closure of valve 14. Furthermore, the aquastat also controls the valve 14. For example, if valve 14 is closed and the aquastat 51 is operated in response to a heat demand it can effect an opening of valve 14 because of the relatively movable relation which exists between arm 36 and the lever 21. However, it will be noted that the interconnection between the valves 14 and 17 insures at least one of said valves being always open whereby at all times to provide a path for the free flow of products of combustion from the combustion chamber to the stack.

Under idling conditions of the furnace, that is, when there is neither a house heating or water heating demand, the valves 14 and 17 will occupy the positions shown in Fig. 1, the valve 17 being closed and thereby preventing the flow of hot products of combustion to the heat-exchange device 15 but the valve 14 being open to permit the products of combustion, under such idling conditions wherein no induced draft is used, to pass through the passage 9 and device 11 to the breeching and stack. When heat is demanded for house heating purposes, valve 14 will be closed, valve 17 open, and the exhauster 18 operated with the air inlet valve 7 open to operate the furnace under induced draft while supplying heat to the heat-transfer device 15. The manner in which the motor 19 for the draft inducer and the solenoid for the air inlet valve are controlled will be apparent from the description of the wiring diagram which hereinafter appears.

If the valves occupy the positions shown in Fig. 1 and a hot water heat demand occurs, no further actuation of valve 14 is necessary since it is already raised from its seat. However, the aquastat functions to effect an energization of the exhauster motor 19 and solenoid 66 for the air inlet valve whereupon the furnace will operate under induced draft to supply heat to the heat-transfer device 11. Furthermore, should the valve 17 be raised and valve 14 slated, under which conditions the furnace will be supplying heat to the device 15 for house heating purposes, and the aquastat operates in response to a heat demand, the valve 14 will also be raised and heat will then be supplied to both heat-transfer devices 11 and 15.

Figure 4:
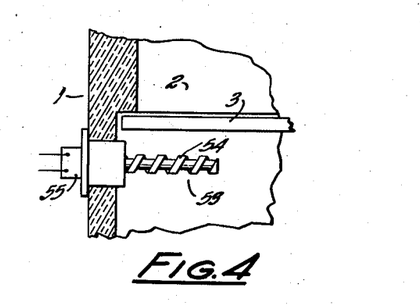
Fig. 4 is a fragmentary view of the furnace showing a preferred disposition of one of the furnace control elements.

In order to maintain the temperature in the combustion chamber sufficiently high at all times to support combustion of the fuel when air is admitted, I provide a heat-responsive element, indicated generally at 53, in Fig. 1 and shown more in detail in Fig. 4. This element is shown, for purposes of illustration, as comprising a helical, bi-metallic strip 54 which is arranged to make and break an electrical circuit through a switch associated therewith and which may be contained in the housing 55. The thermostatic element 53 is preferably disposed below but in close relation to the grate of the furnace, as shown, and serves, when the temperature of the fuel bed drops to a predetermined low value, one above but approaching the ignition temperature of the fuel, to close an electrical circuit to the exhauster motor 19 and solenoid 66 for the air-inlet valve, and, when the temperature of the fuel bed is sufficiently high, to open said circuit. In this manner the temperatures within the combustion chamber or of the fuel bed are always maintained sufficiently high to insure combustion of the fuel therein when air is supplied, and it will be noted that the valve 14 will be opened during idling periods and when element 53 places the furnace under induced draft to permit the products of combustion to pass freely from the combustion chamber to the stack. The manner in which the device 53 is electrically connected in circuit will also be apparent from the following description of the wiring diagram for the controls of my furnace.

Figure 5:
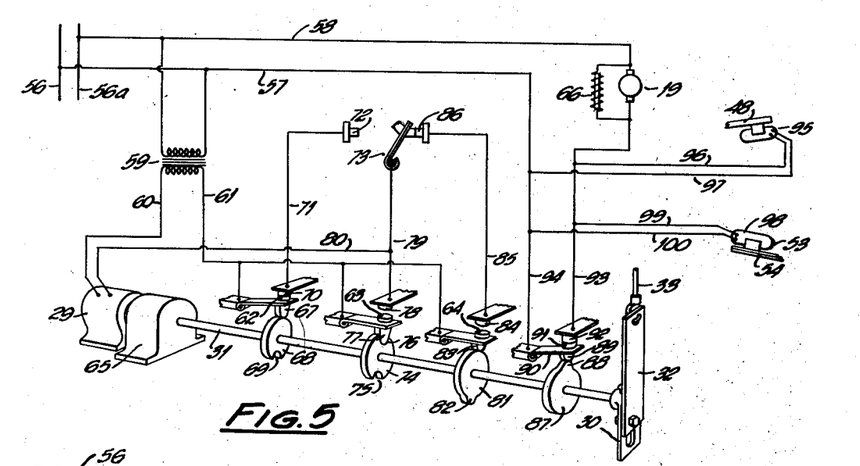
Fig. 5 is a wiring diagram illustrating somewhat schematically one of the control elements in perspective.

Referring to Fig. 5, power is derived from the main lines 56 and 56a to which are connected the conductors 57 and 58. A transformer 59 has its primary connected across conductors 57 and 58 and one side of its secondary is connected through conductor 60 to the control motor 29, hereinbefore referred to. The other side of the secondary is connected through conductor 61 to a plurality of contacts 62, 63 and 64. The conductor 61 is illustrated as connected to the supports on which the arms, bearing these contacts, are pivotally supported but it will be understood that an electrical circuit is established therebetween. Motor 29 through a speed reducing mechanism 65 drives shaft 31 on which the crank arm 30 is mounted as hereinbefore described. On shaft 31 are also mounted a plurality of cams which are designed to control the circuit to motor 29 and also to control the circuit to fan motor 19 and to a solenoid 66.

I have shown, merely for purposes of illustration, the solenoid 66 as a means for operating valve 7 in the air inlet opening to the ash pit of the furnace. However, it will be understood that a damper motor similar to the control motor 29 or other desired means may be employed for this purpose.

Contact 62 is mounted on an arm provided with a boss 67 which is adapted to engage the surface of a cam 68 secured on shaft 31. Cam 68 is provided with a recess 69 in which the boss 67 is adapted to drop when in registry therewith. When this occurs, contact 62 is separated from a second contact 70, which it otherwise engages, and the circuit through conductor 61, contacts 62 and 70 and a conductor 71, which connects contact 70 with one contact 72 of a thermostat 73, will be broken. Otherwise, however, this circuit will be maintained. A second cam 74, which is also secured on shaft 31, is provided with diametrically opposed recesses 75 and 76. Contact 63 is mounted on an arm provided with a boss 77 which is adapted to enter either one of these recesses. However, when the cam rotates, boss 77 will be forced out of one of these recesses and will ride upon the surface of the cam, holding contact 63 in engagement with a second contact 78 until the boss 77 registers with another of the recesses. Contact 78 is connected through conductor 79 to the bi-metallic arm of the thermostat 73, and it is also connected through conductor 80 to one side of the motor 29. A third cam 81, secured on shaft 31, is provided with a projection 82 which is adapted when the shaft 31 is rotated to engage a boss 83 on the arm bearing contact 64. When projection 82 engages boss 83, it urges contact 64 into engagement with a second contact 84 which is connected through conductor 85 to a second contact 86 of the thermostat 73.

The cams and associated contacts, above described, in conjunction with thermostat 73 control the operation of motor 29. For example, if the bi-metallic arm of thermostat 73 engages contact 72, an electrical circuit will be established to motor 29 from the secondary of transformer 59 through conductor 60 to one side of the motor and through conductors 80 and 79, the bi-metallic arm of thermostat 73, contact 72, conductor 71, contacts 70 and 62 and conductor 61. When this circuit is established, the motor will rotate shaft 31 and the cams thereon through approximately 180 degrees whereupon boss 67 will enter recess 69 in the cam 68 and break this circuit between contacts 62 and 70. The cam 74 and the circuit controlled thereby is designed to maintain a circuit to motor 29 after it has once been energized through an operation of the thermostat. In other words, as soon as motor 29 is energized and commences rotating the shaft 31 and the cams thereon, cam 74 will cause contact 63 to engage contact 78 and thereby establish a circuit direct from conductor 61 through these contacts and conductors 79 and 80 to the motor. Hence, whenever motor 29 is energized it must rotate shaft 31 through substantially 180 degrees before it can stop.

When the cams have been moved to positions 180 degrees from those shown in Fig. 5, the circuit will be opened between contacts 62 and 70 and between contacts 63 and 78 but the boss on cam 81 will hold contacts 64 and 84 in engagement. Therefore, if under these conditions the bi-metallic arm of thermostat 73 should engage the contact 86 thereof, a circuit will be established to motor 29 which includes conductor 61, contact 64 and 84, conductor 85, contact 86 and the bi-metallic arm of thermostat 73, and conductors 79 and 80.

It will be understood that thermostat 73 is designed to control the furnace for house heating purposes and, in the arrangement of the elements of my circuit shown in Fig. 5, an engagement of contact 86 of the thermostat by the arm 73 thereof will cause motor 29 to rotate the shaft 31 and its associated cams and crank arm 30 to the positions shown in Fig. 5. In this position thereof, the furnace will operate under forced draft, as hereinafter explained, and with the valve 17 of the furnace open. After this heat demand has been satisfied and when the bi-metallic arm of thermostat 73 engages the contact 72, the motor 29 will again be energized to move the shaft 31 through 180 degrees, thereby to close the valve 17 in the furnace and also to deenergize the fan motor and close the air inlet valve 7 as will be evident from the following.

When the shaft 31 and its associated elements occupy the positions shown in Fig. 5, a fourth cam 87, secured on shaft 31 will occupy a position effecting a closure of an electric circuit to fan motor 19 and solenoid 66. At this time, crank arm 30 will be in a position holding valve 17 of the furnace in open position. The cam 87 is provided with a projection 88 which is adapted to engage a boss 89 on an arm 90 on which is also mounted a contact 91. When the projection 88 engages the boss 89, as shown in Fig. 5, it will cause contact 91 to engage a second contact 92 which is connected through conductor 93 to one side of the motor 19 and solenoid 66; the other sides thereof being connected through conductor 58 to the main line conductor 56a. Contact 91 through arm 90 is electrically connected with a conductor 94 which is connected through conductor 57 to the main line conductor 56. Hence, when crank arm 30 is in the position illustrated, in which position thereof valve 17 will be open, both the fan motor 19 and solenoid 66 will be energized and, under these conditions, the furnace will operate under forced draft to supply heat to the heat-transfer device 15 for house heating purposes.

In order to provide a forced draft when heat is demanded for domestic hot water heating purposes, I provide the arm 48 of the aquastat 49, in the embodiment illustrated, with a switch 95, as shown in Fig. 1 and schematically shown in Fig. 5. The switch 95 is connected between conductors 96 and 97 which in turn are respectively connected to the conductors 93 and 94.

When the aquastat actuates arm 48 to open valve 14 in response to a heating demand, switch 95, shown for exemplary purposes as a "Mercoid" type switch, will be tilted to establish electrical connection between the conductors 96 and 97. A closure of switch 95 establishes a circuit to the fan motor 19 and solenoid 66 and, therefore, when a domestic hot water heating demand occurs valve 14 will be opened, or if opened, will remain open until this demand is satisfied and the furnace will operate under forced draft with the valve 7 open through the energization of solenoid 66 and with the fan motor 19 in operation.

The heat responsive device 53, hereinbefore described, is shown schematically in Fig. 5 as comprising the switch 98 which is connected between the conductors 99 and 100, these conductors being respectively connected to conductors 93 and 94. It will be understood that the device 53 is so arranged that the operation of the bimetallic element 54, due to a predetermining drop in the temperature to which it is responsive, will operate switch 98 to close the circuit between conductors 99 and 100 and thereby close the circuit to the fan motor 19 and solenoid 66. When, however, the temperature of the fuel bed or combustion chamber is sufficiently high to support continued combustion, switch 98 of device 53 will be opened.

It will be observed that when heat is demanded for house heating purposes only, the controls of my invention will place the furnace under forced draft conditions, opening valve 17 and closing valve 14. Therefore, practically all of the available heat will be used for house heating purposes. When this demand has been satisfied, the forced draft will be cut off, the air inlet valve 7 will be closed, the valve 17 also closed and the valve 14 opened. Under no heat demand or idling conditions, products of combustion may pass through passage 9 and heat transfer device 11 supplying some heat for domestic hot water heating purposes. If while the valve 14 is open and a heat demand for domestic hot water heating purposes occurs, the position of valve 14 will not necessarily be changed but switch 95 will close the circuit to the fan motor and solenoid thereby placing the furnace under forced draft conditions, substantially all of the available heat being used for water heating purposes only.

Furthermore, it is important to note that under conditions of no heat demand the temperature of the fuel bed will be maintained sufficiently high at all times to support combustion. Under idling conditions and when the heat responsive device 53 does not place the furnace under induced draft conditions, the air inlet valve 7 will be shut and as no air is admitted to the ash pit and fuel bed, there will be no combustion; however, the valve 14 being open there is a free passage for water vapor or other distillation products from the furnace through the gas passage 9 and breeching 13 to its outlet connection to the chimney. However, upon any heat demand, the air inlet valve will be opened and the exhauster will be placed in operation whereupon heat will be supplied to either one of the heat-transfer devices, or simultaneously to both.

The furnace of my invention, as hereinbefore pointed out, is of a well insulated character whereby adequately to insulate the heat-transfer devices from each other and also from the combustion chamber. For example, the rear wall of the combustion chamber comprises insulating material and extends preferably to an appreciable height above the lower end of the fuel bed. Furthermore, the passage 8 communicates with the combustion chamber near the top thereof and extends above the rear wall, thence downwardly and laterally into communication with the passages 9 and 10 which are preferably vertically arranged. With an insulated construction of this character and assuming that the air inlet valve 7 is closed, the fan motor de-energized and valve 17 closed, transfer of heat to the heat-transfer device 15 is impeded to such a great extent that substantially no heat is supplied thereto. Likewise, substantially no heat will be supplied to the heat-transfer device 11 when the valve 14 is closed.

Due to the retention of heat in the combustion chamber, the temperatures therein will be maintained above the ignition temperature of the fuel over comparatively long periods of no heat demand with an extremely small consumption of fuel. Therefore, fuel will be consumed under furnace idling conditions at a relatively low average rate. For maintaining the fuel bed temperatures sufficiently high to support combustion over idling periods, the heat responsive control 53 is employed and, as hereinbefore explained, placed beneath but in close relation to the furnace grate since in this position thereof it responds substantially directly to the heat of the fuel bed.

It will be observed that in my present invention, whenever air is supplied to the fuel bed only for the purpose of raising the fuel bed temperature heat will be supplied to the heat-transfer device 11 for domestic hot water heating purposes even though no water heating demand exists. In order to limit the degree to which the water in the reservoir may be heated, I prefer to provide an arrangement such as that illustrated in Fig. 6. The domestic hot water reservoir is indicated generally at 101 and is connected with the heat-transfer device 11 by means of pipes 102 and 103. The water tank 104 is provided with a heat insulating jacket 105, which, in the present embodiment of my invention, only partially insulates the water tank, the lower end 106 thereof being uninsulated. The reservoir may rest upon a standard 107, and about the uninsulated, bottom portion of the tank and in spaced relation thereto, I prefer to place a sleeve 108. Sleeve 108 may be suitably supported in any desired manner but preferably with the ends thereof spaced from the floor on which the standard 107 rests and from the bottom of the insulating jacket 105 so that air may enter between the sleeve and the floor and pass upwardly along the un-insulated surface of the tank 104 and then, after cooling the same, pass outwardly between the sleeve and the insulating jacket. Preferably, the sleeve adjacent its top and bottom is outwardly splayed as shown. By insulating but a part only of the hot water tank and insulating it about its upper end, I find that I can provide an adequate supply of hot water at all times but excessive temperatures will not be reached since substantial dissipation of heat may occur from the bottom of the tank. However, no appreciable heat loss from the tank is encountered until the temperature of the water in the lower, un-insulated part of the tank exceeds the ambient, room temperature.

Figure 6:
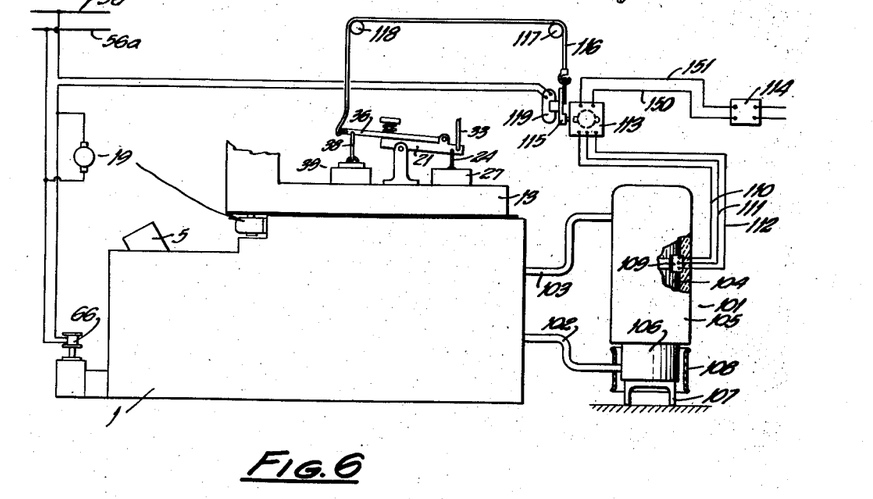
Fig. 6 illustrates my furnace in association with a domestic hot water reservoir arranged in accordance with my invention.

In the embodiment of my invention shown in Fig. 6, I have shown a thermostat or aquastat 109, which is suitably fastened adjacent the surface of tank 104 and which is adapted to function in the same manner as aquastat 49 to control the operation of the furnace for water heating purposes. The aquastat 109 is electrically connected through conductors 110, 111 and 112 to a pilot motor 113 which may be similar to pilot motor 29. Power is supplied through a transformer 114, the secondary of which is connected through conductors 150 and 151 to motor 113, as shown. The pilot motor 113 drives a crank arm 115 to which a cable 116 is connected. Cable 116 passes over pulleys 117 and 118 and is connected to the arm 36, in the same manner as cable 45 hereinbefore described. On the crank arm 115 is mounted a switch 119 which corresponds to switch 95, hereinbefore described in the fan motor and solenoid circuits. The pilot motor 113, therefore, serves to operate valve 14 of the furnace and also through the medium of switch 119 to control the circuit to the fan or exhauster motor 19 and solenoid 66. When the arm 115 occupies the position illustrated, switch 119 is open. However, when arm 115 rotates to a position 180° from that shown to open valve 14, if it is closed, switch 119 will be closed.

Figure 7:
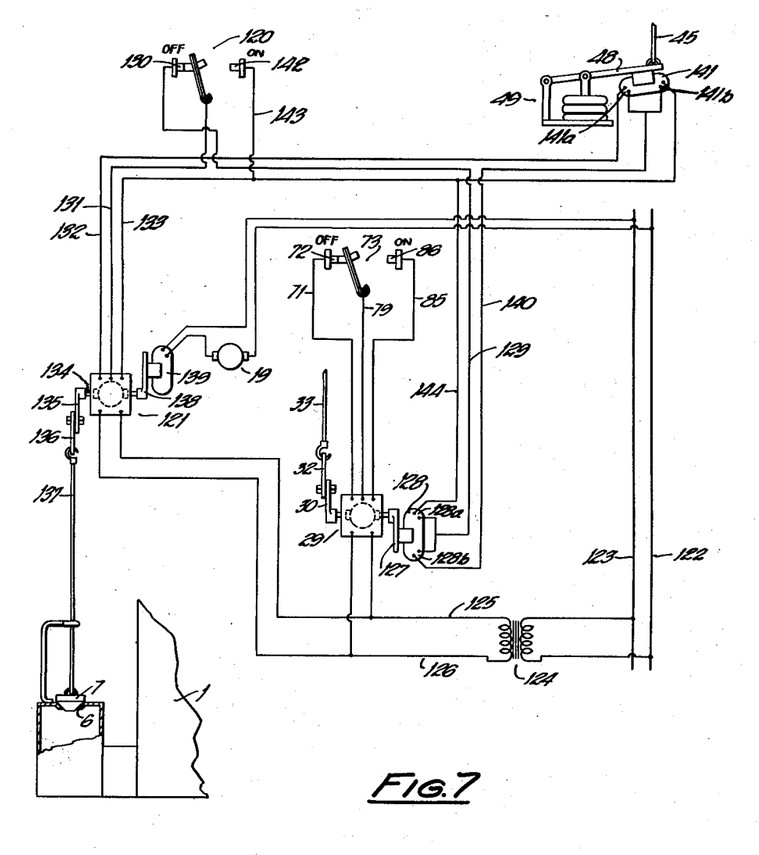
Fig. 7 is a wiring diagram of a modified control system for my furnace.

In the embodiment of my invention illustrated in Fig. 7, I have provided a pilot motor similar to pilot motor 29, hereinbefore described, for operating the main air inlet valve and for operating a control switch in the fan or exhauster motor circuit. In this embodiment, of course, a pilot motor serves the purpose of the solenoid 66.

The control circuit illustrated in Fig. 7 includes the pilot motor 29, hereinbefore described, an aquastat 49, also described in the foregoing, a thermostatic element 120 which is adapted to be disposed below the grate of the furnace in heat-responsive relation to the fuel bed and which has a function similar to that of the device 53, above described, and a pilot motor 121 which is controlled through operations of the motor 29, aquastat 49 and thermostatic element 120 to close or open the circuit to the exhauster motor 19 and to open and close the main air inlet valve 7.

It will be understood that motor 121 is controlled, when suitably energized, like motor 29 to move its shaft through 180° from one position to another in which the valve 7 is opened and exhauster motor 19 energized or in which valve 7 is closed and exhauster motor 19 de-energized, respectively. An inspection of Fig. 5 will disclose the manner in which these motors are controlled by the cam-operated contacts when employing a three wire control circuit and, therefore, in Fig. 7, I have merely shown the external circuits to these motors.

Energy for operating motors 29 and 121 is derived from the power lines 122 and 123 through transformer 124 and conductors 125 and 126 across which the motors are connected through their cam-operated contacts or switches. Pilot motor 29 is controlled by the thermostat 73, the bi-metallic arm of the thermostat being connected through conductor 79 to one motor control contact and contacts 72 and 86 being connected respectively to other motor control contacts through conductors 71 and 85 as hereinbefore described. The shaft 31 of motor 29 functions through arm 30, connector 32 and cable 33 to operate valve 17 of the furnace and, likewise, controls the circuit to pilot motor 121 through the medium of a second arm 127 secured to shaft 31 and on which is mounted a switch 128. Switch 128, of course, may be mounted on arm 30.

Switch 128 comprises two pairs of contacts, one pair being indicated at 128a and the second pair at 128b. One contact of each pair are connected electrically together and with a fixed contact 130 of the thermostatic device 120, responsive to fuel bed temperatures. The bi-metallic arm of device 120 is connected to conductor 131 which in turn is connected to one side of motor 121 and to a contact of one of the cam actuated switches thereof corresponding to contact 78 of Fig. 5. Likewise, conductors 132 and 133 are respectively connected to contacts of the control mechanism of motor 121 which correspond to contacts 70 and 84 of motor 29.

Hence, if a circuit is made to motor 121 through conductors 131 and 132, the motor will operate to rotate the shaft 134 from a starting position through 180° whereupon it will stop and thereafter, if a circuit is made through conductors 131 and 133, the motor will operate to rotate shaft 134 through 180°, stopping at its assumed starting position.

Motor 121 has secured to the shaft 134 thereof a crank arm 135 to which is secured an adjustable connector 136 which, in turn, is connected with a cable 137. Cable 137 is operatively connected with air inlet valve 7 whereby motor 121 functions to open or close the air inlet valve. On shaft 134 is secured a second crank arm 138, angularly disposed substantially 180° with respect to crank arm 135. A switch 139 is mounted on arm 138 and serves to control the circuit to exhauster motor 19. Of course, switch 139 may be mounted on or operated by crank arm 135 or in any suitable manner. In the embodiment illustrated, the switch and crank arms are so arranged that when motor 121 is operated to open the air inlet valve 7 switch 139 will be operated to close the circuit to the exhauster motor and when the air inlet valve is closed the exhauster motor circuit will be opened.

In Fig. 7 I have illustrated the switches of the control devices and the pilot motors 29 and 121 in what may be termed "off" positions, that is, the positions which they assume when no heat demand exists for any purpose and the fuel bed temperature is sufficiently high and the furnace is "idling." Under these conditions, the shaft of control motor 121 occupies a position in which the air inlet valve 7 is closed and the switch 139 in the exhauster motor circuit is open and the circuit to motor 121 is completed through conductors 131 and 132, the circuit through conductors 131 and 133 being open.

The circuit from conductor 131 to conductor 132 is made as follows: Conductor 131 is connected with the bimetallic arm of thermostatic device 120 which in its "off" position engages contact 130 to which conductor 129 is connected. With switch 128 in "off" position, as illustrated, its contacts 128b are electrically connected together, one thereof being connected to conductor 129 and the other being connected to conductor 140 which is also connected with one of both pairs of contacts of a switch 141 of the aquastat 49. The Sylphon bellows 51 or diaphragm of aquastat 49 actuates lever 48 on which switch 141 is mounted. I have assumed that when the lever occupies the position shown the switch 141 is in "off" position and when the inclination of the arm is reversed the switch is in "on" position. Therefore, in the position thereof shown, the pair of contacts 141a of switch 141 are electrically connected together, and since conductor 140 is connected to one of these contacts and conductor 132 is connected to the other, conductors 131 and 132 will be electrically connected together to form a circuit to motor 121 causing it to place the shaft thereof in the "furnace idling" position illustrated.

It will be observed that since the switch devices between conductors 131 and 132 are in series, all heat demands or temperature conditions to which the control devices are responsive must be satisfied before the induced draft can be cut off to the furnace and the air inlet valve closed.

However, in order to place the furnace under induced draft operating conditions, it is merely necessary for but one heat demand or temperature condition to exist requiring accelerated combustion under induced draft in order to cause motor 121 to operate to open the air inlet valve and energize the exhauster motor 19. Energization of motor 121 to produce this result is accomplished, as hereinbefore indicated, by closing a circuit between conductors 131 and 133 and this may be independently performed by any one of the control devices, thermostatic device 120, aquastat 141 or motor 29.

Conductor 131, as hereinbefore described, is connected to the bi-metallic arm of thermostatic device 120, and the contact 130 thereof is connected through conductor 129 to one contact of both pairs of contacts 128a and 128b of switch 128. When the bi-metallic arm of device 120 is in "off" position, it engages contact 130, establishing a circuit to switch 128. This arm is adapted to engage either contact 130 or a second contact 142. Contact 142 is connected through conductor 143 directly to conductor 133. Hence, when the bi-metallic arm engages contact 142 it completes a circuit through conductors 131 and 133 to motor 121 causing it to operate to open the main air inlet valve and to close switch 139 to the exhauster motor 19.

When the device 120 is in "off" position, conductor 131 is connected therethrough to conductor 129 and to one contact of the pair of contacts 128a of switch 128. The other contact of this pair is connected through conductor 144 to conductor 133. Therefore, assuming that the arm of device 120 lies in "off" position, if the room thermostat 73 energizes motor 29 in response to a heat demand, motor 29 will close switch 128 between the contacts 128a thereof and a circuit between conductors 131 and 133 will be established through the device 120, conductor 129, switch contacts 128a and conductor 144, causing motor 121 to place the furnace under induced draft conditions.

The aquastat, as hereinabove described, includes switch 141 which comprises a first pair of contacts 141a, connected, respectively, to conductors 132 and 140. This switch also comprises a second pair of contacts 141b, one of which is also connected with conductor 140 and the other of which is connected with conductor 133. Hence, if switch 128 is in "off" position as well as device 120, conductor 131 will be electrically connected through device 120 and contacts 128b of switch 128 to conductor 140 and one of the pair of contacts 141b of the aquastat switch 141. Therefore, if the inclination of arm 48 of aquastat 49 is reversed due to a heat demand, contacts 141b will be electrically connected together and a circuit established between conductors 131 and 133 to cause motor 121 to move to "on" position, placing the furnace under induced draft conditions.

From the foregoing description of the arrangement of furnace controls shown in Fig. 7, which I prefer to use, it should be evident that either the thermostatic device 120, the room thermostat 73 and its associated motor 29 or aquastat 49 may operate to cause motor 121 to open the air inlet valve 7 and close switch 139 in the circuit to exhauster motor 19 thereby placing the furnace under induced draft conditions and to maintain this furnace operation until all heat demands or any need for such an operation of the furnace is satisfied. However, an operation of motor 121 to place the furnace under "idling" conditions will not occur until house-heating and water-heating demands have been satisfied and the fuel bed temperature is sufficiently above the fuel ignition temperature as to require no increase therein. Obviously, the respective controls may function during an operation of the furnace under induced draft conditions to supply heat where it may be demanded and substantially to cut off the flow of hot gases of combustion through one or the other of the heat-transfer devices as hereinbefore explained.

It will be observed that in the furnace of this invention no heat can be supplied thereby for house heating purposes in the absence of a heating demand therefor. Furthermore, when a heat demand for domestic hot water heating purposes occurs, the furnace will be operated to satisfy this demand only, or, the furnace may be operated to satisfy a house heating demand or simultaneously to satisfy both a hot water and house heating heat demand. Under furnace idling conditions, some heat may be supplied for domestic hot water heating purposes but excessive water temperatures in the water reservoir cannot exist because of the arrangement hereinbefore described. It will be observed, therefore, that even under furnace idling conditions or when the furnace is operated merely to elevate the fuel bed temperature the heat so generated is used to advantage.

Although I have illustrated and described the furnace of my invention as comprising walls of a heat-insulating character it will be understood that the inner walls of the combustion chamber and passages are lined with fire brick or other suitable heat resistant material. While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, means for controlling the flow of gases to both of said heat-transfer devices, and flow-control operating means including means responsive to temperatures within the house for effecting operations of said flow-control means to positions admitting a flow of said gases to said first heat-transfer device while preventing a flow through said second heat-transfer device and to positions substantially preventing a flow of gases to said first heat-transfer device while admitting said gases to said second heat-transfer device, and means responsive to the temperature of said water supply for effecting an operation of said flow-control means to admit said gases to said second heat-transfer device if in a position preventing the flow of gases thereto.

2. A solid-fuel burning furnace of the character described comprising a combustion chamber having a grate therein upon which the fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, means for controlling the flow of gases to said heat-transfer devices, a first means including a first heat-responsive means responsive to temperatures within the house for actuating said control means to a position substantially preventing the flow of gases of combustion to one of said heat-transfer devices while permitting a free flow of said gases to the other of said heat-transfer devices and a second means including a second heat-responsive means responsive to the temperature of said water supply for actuating said control means to a position permitting the free flow of said gases to said second heat-transfer device if in a position preventing the flow of gases thereto.

3. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, means for controlling the flow of gases to said first heat-transfer device, means for controlling the flow of gases to said second heat-transfer deivce, means including a thermostat responsive to temperatures within the house for operating both of said flow-control means to positions substantially preventing the flow of gases of combustion to one of said heat-transfer devices while at the same time permitting the flow of said gases to the other of said heat-transfer devices and means including an aquastat responsive to the temperature of the water supply for operating one of said flow-control means when in flow-preventing position to a position permitting a flow of said gases to said second heat-transfer device.

4. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, means for so controlling the flow of gases to both of said heat-transfer devices that said gases of combustion may at all times flow freely through at least one of said heat-transfer devices, means for producing an induced draft through said combustion chamber, means including thermostatic means responsive to temperatures within the house and of said water supply, respectively, for controlling the operation of said draft-producing means and for effecting operations of said flow-control means, and thermostatic means disposed in heat-responsive relation to heat radiated from the fuel burning on said grate in said combustion chamber for controlling the operation of said draft-producing means.

5. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, a valve for controlling the flow of said gases to said first heat-transfer device, a second valve for controlling the flow of said gases to said second heat-transfer device, pivotally mounted means operatively connected to a first of said valves and movable to open and close the same, said pivotally mounted means being provided with a second, movable means for positively opening the second of said valves when an actuation of said pivotally mounted means occurs to close said first valve but said second means being movable to open said second valve independently of the movement of said pivotally mounted means in one direction.

6. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to provide heat for house heating purposes, a second of said passages including a second heat-transfer device adapted to impart heat to a domestic hot water supply, a valve for controlling the flow of said gases to said first heat-transfer device, a valve for controlling the flow of said gases to said second heat-transfer device, a first lever pivotally mounted intermediate the ends thereof and operatively connected to one side of its pivotal mounting to a first of said valves, a second lever pivotally connected to said first mentioned lever to the side of its pivotal mounting to which said first valve is connected and said second lever being operatively connected to the second of said valves to the other side of the pivotal mounting of said first mentioned lever, said levers being so constructed, correlated and arranged that relative pivotal movement thereof may occur in a direction to open both of said valves but relative pivotal movement thereof in the opposite direction to close both of said valves is prevented.

7. A solid-fuel burning furnace of the character described comprising a combustion chamber having a grate therein upon which fuel may burn, means defining a plurality of passages having communication with said combustion chamber and through which the gases of combustion may flow, a first of said passages including a first heat-transfer device adapted to supply heat for house-heating purposes, a second of said passages including a second heat-transfer device adapted to supply heat for domestic hot water heating purposes, means for controlling the flow of gases to both of said heat-transfer devices, means including thermostatic means responsive to house temperatures for effecting when a heat demand occurs an operation of said flow-control means to pass gases of combustion to said first heat-transfer device and substantially to cut off the passage of said gases to said second heat-transfer device, and substantially to cut off the flow of said gases to said first heat-transfer device and to pass said gases to said second heat-transfer device when said demand has been satisfied, and means including thermostatic means responsive to the temperatures of the domestic hot water supply for effecting an operation of said flow-control means to pass said gases to said second heat-transfer device while said gases are being passed to said first heat-transfer device.

8. A furnace of the character described comprising a combustion chamber within which fuel may burn, means defining a plurality of passages having communication with said combustion chamber and through which the gases of combustion may flow, a first of said passages including a first heat-transfer device adapted to supply heat for house-heating purposes, a second of said passages including a second heat-transfer device adapted to supply heat for domestic hot water heating purposes, means for controlling the flow of gases of combustion to said heat-transfer devices, and means including thermostatic means for effecting when a house heating demand occurs an operation of said flow-control means to pass gases of combustion to said first heat-transfer device and substantially to cut off the passage of said gases to said second heat-transfer device, said last mentioned means operating when said heat demand is satisfied to position said flow-control means substantially to cut off the flow of gases to said first heat-transfer device and to pass said gases to said second heat-transfer device, and a domestic hot water reservoir associated with said second heat-transfer device, said reservoir being in part thermally insulated but having its sides adjacent the bottom thereof uninsulated whereby heat may be dissipated from said reservoir while preserving a supply of hot water.

9. A furnace of the character described comprising a combustion chamber having a grate therein upon which fuel may burn, means defining a plurality of passages having communication with said combustion chamber and through which the gases of combustion may flow, a first of said passages including a first heat-transfer device adapted to supply heat for house heating purposes, a second of said passages including a second heat-transfer device adapted to impart heat to a domestic hot water supply, blower means for producing accelerated combustion of said fuel, means for controlling the flow of gases to said heat-transfer devices, means including a thermostat responsive to house temperatures for actuating said flow-control means to positions wherein gases of combustion may freely flow to either one or the other of said heat-transfer devices and for controlling said blower means, and means responsive to heat radiated from said grate and the fuel thereon for controlling the operation of said blower means.

10. A furnace of the character described comprising a combustion chamber having a grate therein upon which fuel may burn, means defining a plurality of passages having communication with said combustion chamber and through which the gases of combustion may flow, a first of said passages including a first heat-transfer device adapted to supply heat for house heating purposes, a second of said passages including a second heat-transfer device adapted to impart heat to a domestic hot water supply, blower means for producing accelerated combustion of said fuel, means for so controlling the flow of gases to said heat-transfer devices that said gases of combustion may at all times flow freely through at least one of said heat-transfer devices, a first thermostat adapted to be disposed in responsive relation to temperature within the house, a second thermostat adapted to be disposed in responsive relation to the temperature of the water supply, means controlled by said first thermostat for actuating said flow-control means to positions substantially preventing the flow of said gases of combustion to one of said heat-transfer devices while permitting a free flow of said gases to the other heat-transfer device and for controlling the operation of said blower means, and means controlled by said second thermostat for actuating said flow-control means, if in a position preventing the flow of gases to said second heat-transfer device, to a position permitting the free flow of said gases to said second heat-transfer device and for controlling the operation of said blower means.

11. A solid-fuel burning furnace of the character described having a grate therein and provided with a combustion chamber and a plurality of passages having communication with said chamber and through which gases of combustion may flow, a first of said passages including a first heat-transfer device adapted to provide heat for house heating purposes, a second of said passages including a second heat-transfer device adapted to impart heat to a domestic hot water supply, means, including means responsive to house temperatures, adapted both to permit and to prevent the flow of gases to either of said heat transfer devices when there is no demand for heat from said water supply, and mean, including means responsive to water-supply temperatures, adapted to permit a flow of gases to said second heat-transfer device upon a demand for heat from said water supply when such flow is otherwise prevented by the first mentioned means.

12. A solid-fuel burning furnace of the character described comprising a combustion chamber having a fuel grate therein, and provided with a plurality of passages having communication with said chamber through which the gases of combustion may flow, one of said passages including a first heat-transfer device adapted to provide heat for house heating purposes, another of said passages including a second heat-transfer device adapted to impart heat to a domestic hot water supply, and means, including means responsive to house temperatures and means responsive to water supply temperatures for so controlling the flow of gases through said plurality of passages that said gases may at all times flow freely through at least one thereof.

13. A solid-fuel burning furnace of the character described comprising a combustion chamber having a fuel grate therein and provided with at least two passages having communication with said combustion chamber and through which the gases of combustion may flow, one of said passages including a first heat-transfer device adapted to provide heat for house heating purposes and another of said passages including a second heat-transfer device adapted to impart heat to a domestic hot water supply, a first movable means for effecting and cutting off the flow of gases to said first heat-transfer device, a second means movable independently of said first movable means for effecting a flow of gases to said second heat-transfer device, means for moving said means, means interconnecting said movable means and providing for joint movement thereof, means responsive to house temperatures for controlling the joint movements of said movable means, and means responsive to water supply temperatures for controlling the independent movements of said second means.

14. A solid-fuel burning furnace of the character described comprising a fuel grate, means above said grate for feeding fuel thereto, means for supplying heat for house heating purposes, means for supplying heat for a domestic hot water supply, means responsive to house temperatures and said water temperatures, respectively, for controlling the operations of said respective heat supplying means, and means for maintaining the fuel on said grate at a combustible temperature during periods when there is no demand for heat from said house or said water supply comprising a valve for admitting air to said furnace below said grate, means for creating a forced draft of air through said valve and grate, means for driving said draft-creating means, and means responsive to heat radiated from said grate and the fuel thereon for controlling the operation of said draft-creating means and said valve; said valve, when closed, sealing said furnace against the entrance of air below said grate.

15. A solid-fuel burning furnace of the character described comprising a fuel grate, means above said grate for feeding fuel thereto, means for supplying heat for house heating purposes, means responsive to house temperatures for controlling the operations of said heat supplying means, and means for maintaining the fuel on said grate at a combustible temperature during periods when there is no demand for heat from said house and comprising a valve for admitting air to said furnace below said grate, means for creating a forced draft of air through said valve and grate, means for driving said draft creating means, and means responsive to heat radiated from said grate and the fuel thereon for controlling the operation of said draft-creating means and said valve; said valve, when closed, sealing said furnace against the entrance of air below said grate.

16. A solid-fuel burning furnace of the character described comprising a fuel grate, means above said grate for feeding fuel thereto, means for supplying heat for a domestic hot water supply, means responsive to the temperature of the water in said supply for controlling the operations of said heat supplying means, and means for maintaining the fuel on said grate at a combustible temperature during periods when there is no demand for heat from said water supply, comprising a valve for admitting air to said furnace below said grate, means for creating a forced draft of air through said valve and grate, means for driving said draft creating means, and means responsive to heat radiated from said grate and the fuel thereon for controlling the operation of said draft-creating means and said valve; said valve when closed, sealing said furnace against the entrance of air below said grate.

WARREN S. BLAUVELT.